(12) United States Patent
Tsitkova et al.

(10) Patent No.: US 8,776,198 B2
(45) Date of Patent: Jul. 8, 2014

(54) TECHNIQUES FOR NON-UNIQUE IDENTITY ESTABLISHMENT

(75) Inventors: Zhanna A. Tsitkova, Chestnut Hill, MA (US); Stephen R. Carter, Spanish Fork, UT (US); Tammy Anita Green, Provo, UT (US); Lloyd Leon Burch, Payson, UT (US)

(73) Assignee: Oracle International Corporation, Redwood Shores, CA (US)

( * ) Notice: Subject to any disclaimer, the term of this patent is extended or adjusted under 35 U.S.C. 154(b) by 918 days.

(21) Appl. No.: 12/024,640

(22) Filed: Feb. 1, 2008

(65) Prior Publication Data

US 2009/0199282 A1 Aug. 6, 2009

(51) Int. Cl.
G06F 21/00 (2013.01)

(52) U.S. Cl.
USPC ..................................... 726/7; 726/2; 726/26

(58) Field of Classification Search
USPC ..................................... 726/2, 26, 7; 713/182
See application file for complete search history.

(56) References Cited

U.S. PATENT DOCUMENTS

| | | | |
|---|---|---|---|
| 5,815,252 A | 9/1998 | Price-Francis | |
| 6,038,315 A * | 3/2000 | Strait et al. | 713/183 |
| 6,038,334 A | 3/2000 | Hamid | |
| 6,072,891 A | 6/2000 | Hamid et al. | |
| 6,219,639 B1 * | 4/2001 | Bakis et al. | 704/246 |
| 6,516,416 B2 | 2/2003 | Gregg et al. | |
| 6,970,582 B2 | 11/2005 | Langley | |
| 7,050,933 B2 | 5/2006 | Parvin et al. | |
| 7,203,343 B2 | 4/2007 | Manasse et al. | |
| 7,203,619 B2 | 4/2007 | Parvin et al. | |
| 7,231,657 B2 * | 6/2007 | Honarvar et al. | 726/2 |
| 7,237,115 B1 * | 6/2007 | Thomas et al. | 713/176 |
| 7,272,245 B1 | 9/2007 | Layton | |
| 7,286,691 B1 | 10/2007 | Modl | |
| 7,286,957 B2 | 10/2007 | Parvin et al. | |
| 7,290,288 B2 | 10/2007 | Gregg et al. | |
| 7,356,168 B2 * | 4/2008 | Tavares | 382/115 |
| 2001/0036297 A1 * | 11/2001 | Ikegami et al. | 382/115 |
| 2002/0035542 A1 * | 3/2002 | Tumey et al. | 705/44 |
| 2002/0112177 A1 * | 8/2002 | Voltmer et al. | 713/200 |
| 2004/0078775 A1 * | 4/2004 | Chow et al. | 717/100 |
| 2006/0206724 A1 | 9/2006 | Schaufele et al. | |
| 2006/0210119 A1 * | 9/2006 | Willis et al. | 382/115 |

(Continued)

OTHER PUBLICATIONS

"Information fusion in biometrics" copyright 2003 by Arun Ross from the book "Pattern Recognition Letters" vol. 24, Issue 13, Sep. 2003, pp. 2115-2125 and is attached in PDF format to this office action.*

(Continued)

*Primary Examiner* — Carl Colin
*Assistant Examiner* — Don Zhao
(74) *Attorney, Agent, or Firm* — Kilpatrick Townsend & Stockton LLP

(57) ABSTRACT

Techniques for non-unique identity establishment are presented. A plurality of biometric data associated with a user is acquired from a plurality of biometric devices. The intersection of the biometric data is registered or a vector for the biometric data is registered. This information is also registered along with answers to questions provided by the user. When a user attempts to subsequently access a secure resource of a network, the retained information is compared against user-supplied biometric data and in some cases where appropriate user-supplied answers to establish an identity of the user and to authenticate the user for access to the secure resource.

17 Claims, 3 Drawing Sheets

(56) References Cited

U.S. PATENT DOCUMENTS

2006/0294390 A1* 12/2006 Navratil et al. ............... 713/182
2007/0248249 A1* 10/2007 Stoianov ....................... 382/124
2008/0052527 A1* 2/2008 Siedlarz ........................ 713/186
2008/0059807 A1* 3/2008 Miller et al. .................. 713/186
2008/0098461 A1* 4/2008 Chiou et al. ...................... 726/4
2009/0037978 A1* 2/2009 Luque et al. ...................... 726/2

OTHER PUBLICATIONS

Wikipedia, "Advanced Hand-Based Biometric Authentication Systems," http://www.cse.unr.edu/~cip/wiki/index.php/Advanced_Hand-Based_Biometric_Authentication_Systems, Apr. 7, 2007.*

* cited by examiner ered with a user id (identifier) and a password (secret)
TECHNIQUES FOR NON-UNIQUE IDENTITY ESTABLISHMENT

BACKGROUND

Business transactions and affairs of individuals are increasingly being conducted over the Internet and the World-Wide Web (WWW). As a result, security and establishment of a user's legitimate identity within an electronic environment are vital to privacy concerns and to secure transaction processing.

Typically, identity is established via the use of some identifier for a user and some associated secret. This is commonly achieved via a user id (identifier) and a password (secret) combination. Some issues with this approach includes the fact that user ids and password can be easily stolen or compromised via derived information known about a particular user. For example, it is common for a user to establish a password based on some personal information concerning the user and readily acquired by others, such as birthdate, wedding anniversary date, Social Security Number (SSN), etc. Moreover, for any particular network-based service the user id and password combination must be unique at least with respect to that particular service.

Once a user id is stored and retained and/or the password (of even a hash of the password), this presents an opportunity for the id and password to be potentially compromised. Furthermore, often a user will transmit the id and password over the network, such that eavesdroppers can acquire it more readily. Yet, nearly every service and system uses some form of the id and password combination to establish a legitimate identity of a user.

Additionally, many times users can have tens of different services that they access resulting in a single id and password used for them all or different ids and passwords used for each of them or some combination of them. So, it is fairly common for users to forget a particular id and password combination for a service that is not regularly visited by the user. When this occurs, the service usually offers an automated means for the user to reset or reacquire his/her password. This presents still another security hole that intruders can take advantage of. For instance, an intruder can use a legitimate user's id for purposes of accessing an automated service's password reset or reacquisition features. Assuming the intruder can answer one or more simple questions, the intruder can have a password reset or acquire the legitimate user's password.

Some services may deploy biometrics, such as finger print scans, to avoid a number of the issues discussed above. The problem with this approach is that often the device reading a particular finger print may have some degree of error, such that there may be false positives or false negatives. As a result, biometric techniques have not yet been fully embraced in the industry.

Thus, improved and automated techniques are needed for establishing the identities of users in an electronic and networked environment.

SUMMARY

In various embodiments, techniques for non-unique identity establishment are presented. More specifically and in an embodiment, a method is provided for non-unique identity establishment that is used to authenticate a resource to a service for access in an electronic environment. Multiple biometric data are received from multiple biometric devices associated with a user. Next, an intersection of the multiple biometric data is calculated; each set of biometric data standing alone is considered to be non-unique for establishing an electronic identity for the user whereas the intersection of the multiple biometric data is considered to be a unique factor in establishing the identity for the user. A plurality of answers to a plurality of questions is acquired from the user. Finally, the intersection of the multiple biometric data and the answers to the questions are registered as a mechanism to subsequently authenticate the user and to establish the identity for the user for purposes of accessing a secure resource over a network.

DETAILED DESCRIPTION

A "resource" as used herein refers to a service, an application, a processing environment, a user, a group of users, a role associated with a user or groups of users, a policy, a website, a proxy, a device, data or content, or various combinations of these things. A "secure resource" is one that requires authentication to permit access to it.

"Biometric data" refers to data acquired from biometric devices and is associated with some physical characteristic or aspect of a user, such as a thumbprint, a fingerprint, a retinal scan, a facial scan, a voice pattern, a measurement between eyes of user, a measurement between fingers or fingers and thumbs, etc. Biometric data is captured by biometric devices, scanners, or readers. These devices take landmark measurements of any particular scan or reading and record them as metrics that represent a template for a given user.

"Non-unique identity information" is information that standing alone does not uniquely identify a particular user. As will be further demonstrated herein a novel combination of different sets and types of non-unique identity information is used to establish a unique identity for a user.

An identity is an electronic credential that can be used to authenticate to a secure resource of a network. Each resource of a network is capable of having a unique identity.

Various embodiments of this invention can be implemented in existing network architectures. For example, in some embodiments, the techniques presented herein are implemented in whole or in part in the Novell® network and proxy server products and/or identity based products, distributed by Novell®, Inc., of Provo, Utah.

Of course, the embodiments of the invention can be implemented in a variety of architectural platforms, operating and server systems, or applications. Any particular architectural layout or implementation presented herein is provided for purposes of illustration and comprehension only and is not intended to limit aspects of the invention.

Figure 1:
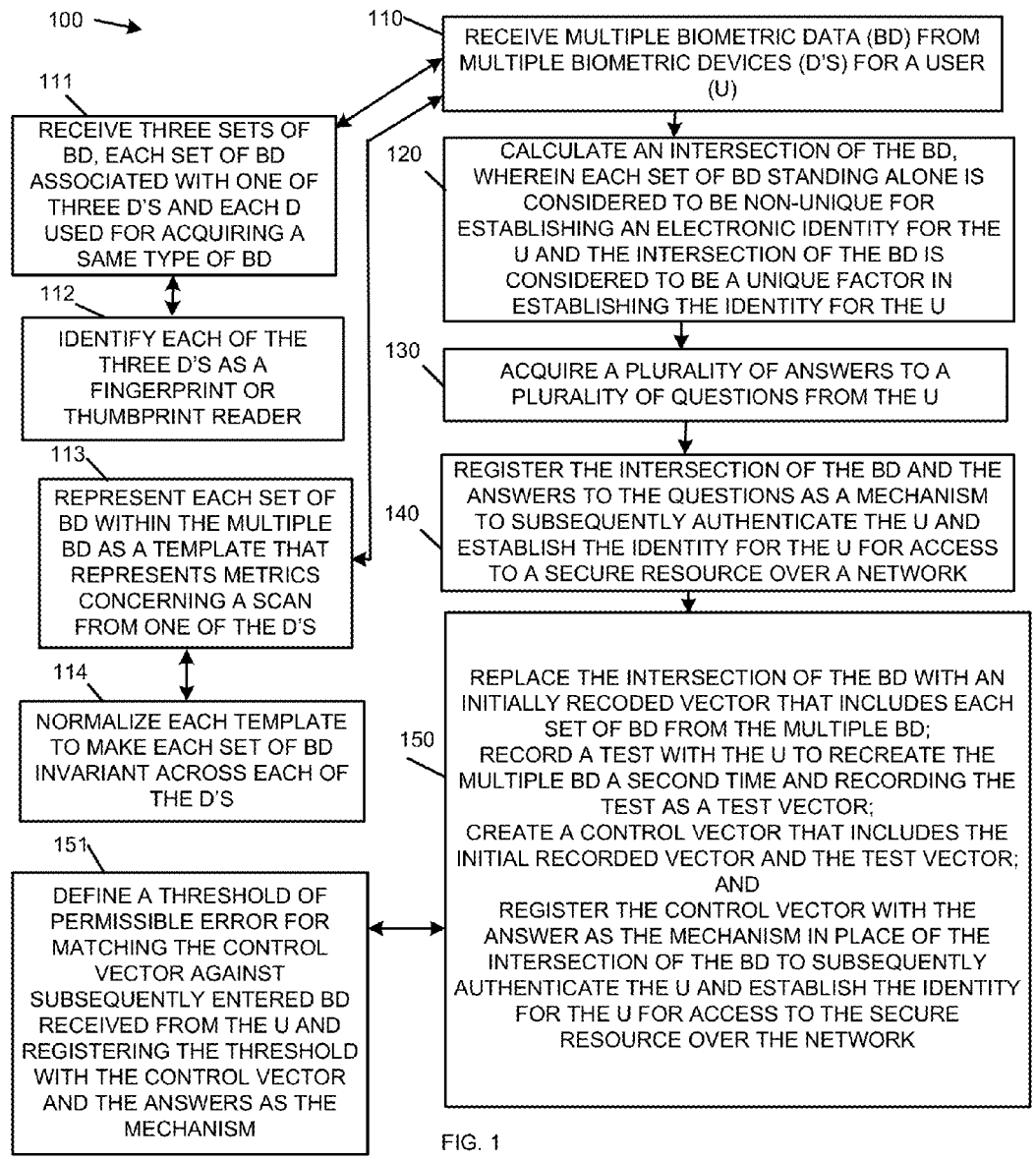
FIG. 1 is a diagram of a method for providing non-unique identity establishment that is used for registering a plurality of non-unique information that subsequently authenticates a user to a unique identity for access to a secure network resource, according to an example embodiment.

FIG. 1 is a diagram of a method 100 for providing non-unique identity establishment that is used for registering a plurality of non-unique information that subsequently authenticates a user to a unique identity for access to a secure network resource, according to an example embodiment. The method 100 (hereinafter "registration service") is implemented in a machine-accessible and readable medium. The registration service is operational over and processes within a network. The network may be wired, wireless, or a combination of wired and wireless.

At 110, the registration service receives multiple biometric data from multiple biometric devices associated with a user. So, initially a user desires to set up an account. In an embodiment, the registration service acts as a stand alone initial registration service for a secure network or secure network resource. In another embodiment, the registration service also acts as an authentication service for the secure network or the secure network resource (example processing and discussion with respect to this aspect of the invention is discussed below in the sample illustration and with the discussion of the FIG. 2).

The user initially desires to set up an account for purposes of accessing a secure network or secure network resource, such as but not limited to the user's online banking account, credit card account, the employer's secure Intranet, etc. The account can be personal to the user or commercial, such as online banking.

Part of the registration process for the user account setup entails the user supplying the multiple biometric data. To do this, the user interacts with multiple biometric devices (scanners, readers, etc.) and acquires readings (referred to as biometric data) from those devices. It is noted that there are a plurality of biometric devices (more than one), such that the multiple biometric data (two sets of biometric data) refers to readings acquired from at least two devices.

The registration service is interfaced over the network to the outputted readings associated with the biometric devices.

In a particular embodiment, at 111, the registration service receives three sets of biometric data. Each set of biometric data is from a different one of the biometric devices. So, there are three biometric devices.

According to an embodiment, at 112, the registration service identifies each set of biometric data received, at 111, as fingerprints or thumbprints received from a different fingerprint or thumbprint reader (biometric device).

In some cases, at 113, the registration service represents or receives each set of biometric data within the multiple biometric data as a template. A template represents valid metrics concerning a particular reading/scan or set of biometric data. For example, in a fingerprint scan major landmarks are identified in a scan and measurements are taken about each landmark and perhaps distances between landmarks. The template is what is recorded and stored for a particular set of biometric data (reading or scan) from a particular one of the biometric devices (readers or scanners (can be voice scanning as well)).

In an embodiment, at 114, the registration service normalizes each template received to make each set of biometric data invariant across each of the multiple biometric devices. So, because of the manner in which biometric device vendors acquire, reduce, and represent biometric information, the vendors have access to functions or software utilities that can be applied to readings acquired from their devices to make their readings invariant across their biometric devices. In some cases, functions are used to make the readings invariant across different vendor devices as well. The normalization can be applied by the vendor biometric device and supplied to registration service when the registration service receives a set of biometric data or the normalization can be applied by the registration service after the set of biometric data is received.

It is noted that there are many physical characteristics of a user (individual) that, while thought to be unique in the general population, may in fact not be unique because of the measuring devices (biometric devices) used to obtain metrics (biometric data) concerning the physical characteristics. A good example of this is that which is associated with fingerprint acquisition. The general understanding is that no two individuals in the population at large have the same identical fingerprint. However, digital fingerprint readers (biometric devices) do not always resolve to unique values between different fingerprint readers. Moreover, sometimes different fingers on the same reader may not resolve to unique values. Thus, mistaking two different fingers for an identical finger is a common concern with fingerprint readers. The opposite can occur as well, where a false negative occurs and a previously recognized finger is not subsequently recognized properly.

By taking readings (multiple biometric data or sets of biometric data) from multiple biometric devices, the registration service (during the registration process) essentially acquires a plurality of non-unique data points for a statistical population, the sum of which (when processed as discussed in greater detail below) is in fact used to reliably establish uniqueness for a particular user.

At 120, the registration service calculates an intersection of the multiple biometric data received at 110. Thus, the registration service uses each non-unique set of biometric data acquired from the user during the registration process over several sampling populations (acquired from multiple different biometric devices) to establish user uniqueness via calculation of the intersection for the multiple biometric data. In other words, the intersection of non-unique data provides a mechanism for establishing uniqueness.

Example calculations and formulae for calculating the intersection is provided below with the sample illustrations that immediately follow the discussion of the FIG. 1 and that precede the discussion of the FIG. 2.

Again, each set of biometric data standing alone is considered to be a non-unique factor in establishing a unique identity for the user, but the intersection of the multiple biometric data (all sets of the biometric data) is used to establish the unique identity. In some cases, however, there may still have to be a form of a tiebreaker where the intersection standing alone does not provide enough confidence (formulae for determining this is presented below) that there is enough information to establish a unique identity for the user.

Accordingly, at 130, the registration service (still during the registration process) acquires a plurality of answers to predefined questions by dynamically interacting with the user. The questions themselves can be defined by an administrator. In some circumstances, the user may supply some of the questions themselves and supply the answers to the questions during the registration process.

Finally, at 140, the registration service registers the intersection of the multiple biometric data (calculated at 120) and the answers (supplied by the user at 130). The combination of this information represents a mechanism that can be subsequently used to authenticate the user and establish a unique identity for the user when the user subsequently (during a different network session) attempts to gain access to the secure network or the secure network resource, which was the subject of the registration process initially. The details of this subsequent network session, authentication process, and user access attempt are discussed in greater detail below with reference to the FIG. 2.

According to an embodiment, at 150, the registration service can forgo the intersection approach by replacing it with a vector-based approach. Again, the details and formulae for implementing the intersection approach and the vector-based approach discussed here are provided below in the sample illustrations that follow the discussion of the FIG. 1 and precede the discussion of the FIG. 2. In the vector-based approach, the registration service replaces the intersection of the multiple biometric data with an initially recorded vector that includes each set of the biometric data recorded from the multiple biometric devices. Next, another test with the user is performed to recreate the multiple biometric data a second time (during the registration process); this is noted as a test vector. It is noted that multiple tests over time can be recorded such that there can be one or more tests and one or more test vectors (discussed below). A control vector is then created that includes the initially recorded vector and the test vector. Finally, the control vector and the answers (discussed above at 130) are used to replace the mechanism (intersection and answers noted at 140). This modified mechanism can then be used to subsequently authenticate the user when the user attempts during a subsequent and different network session to gain access to the secure network resource of the secure network as a whole.

It is noted that in some cases, both the intersection and the control vector approaches can be recorded and noted during the registration process. So, the two approaches can be complimentary and do not have to be mutually exclusive. This may be advantages in situations where during a subsequent authentication attempt the intersection approach is deemed unreliable whereas the control vector approach appears to be reliable.

In an embodiment, at 151, the registration service can also define a threshold of permissible error for matching the control vector against subsequently entered multiple biometric data received from the user during a subsequent user attempt to gain access to the secure network as a whole of the secure network resource. The threshold is also recorded with the mechanism noted at 150 and used during subsequent authentication processing.

It is noted that the more sets of biometric data and different biometric devices used during the registration process, the more accurate user identity establishment will be.

The techniques presented above and below show that a plurality of non-unique information can be calculated and used in such a manner that uniqueness is achieved. This is particularly useful during user authentication for establishment of a unique user identity. Furthermore, the user does not record any secret at any time and the system does not retain any particular secret about the user. This makes for a situation where the traditional password can be dispensed with entirely and creates a more secure authentication process because there is no possibility that a secret can be compromised or stolen because the secret does not exist at all.

Detailed example illustrations of registering and using the registration information discussed above are now presented below. The sample illustrations also show techniques for calculating the intersection (discussed above at 120), creating the control vector (discussed above at 150), and defining thresholds and degrees of error (discussed above at 151).

Sample Illustrations

Problem Setup

An individual can be identified by a binary vector of biometrics x, $x_i \in \{0, 1\}$. Each random variable $x_i$ is distributed as follows:

$$Prob(x_i = s) = \begin{cases} q_i, & s = 1 \\ 1 - q_i, & s = 0. \end{cases}$$

It is clear that in order to be a good authentication material probabilities $q_i$ must be close to 0.5. In the extreme case when all $q_i$ are either 0 or 1 all individuals will have the same biometric vector. In this case discrimination between individuals becomes impossible.

In addition, there is some probability that a reading device may read biometric values incorrectly. So instead of the true value of $x_i$ one has to deal with its measurement $m(x_i)$. It is assumed that:

$$Prob(x_i = m(x_i)) = p_i.$$

The reliable reading device is characterized by the value $p_i$ that is close to 1.

The authentication is conducted by comparing control vector $x^c$ stored in a database with biometric measurements $x^m$. The result is that vector z is defined by the following formula.

$$z_i \equiv (x_i^c = x_i^m)$$

First, consider the case when two samples are obtained from the same individual. In this case the equality $z_i=1$ (i.e., $x_i^c = x_i^m$) holds if and only if both measurements are taken correctly or both measurements are taken incorrectly. Since two measurements are conducted independently one has:

$$Prob(z_i=1) = p_i^2 + (1-p_i)^2 = 2p_i^2 - 2p_i + 1,$$

$$Prob(z_i=0) = 2(1-p_i)p_i = 2p_i - 2p_i^2.$$

Secondly, consider the case when two samples are obtained from different individuals. In this case the equality $z_i=1$ holds if and only if $x_i^c = x_i^m = 1$ or $x_i^c = x_i^m = 0$. Thus:

$$Prob(z_i=1) = (p_i q_i + (1-p_i)(1-q_i))^2 + ((1-p_i)q_i + p_i(1-q_i))^2,$$

$$Prob(z_i=0) = 2(p_i q_i + (1-p_i)(1-q_i))((1-p_i)q_i + p_i(1-q_i)).$$

Let $\mu_i = Prob(z_i=1)$ when the vectors $x^c$ and $x^m$ are taken from the same individual, and $v_i = Prob(z_i=1)$ when the vectors belong to different individuals. For example, if $p_i=0.9$ and $q_i=0.3$ then $\mu_i=0.82$, and $v_i=0.5512$ The process of authentication can be formulated by using the language of mathematical statistics. One has the null hypothesis stating that the vector z is a sample drawn from the sequence of Bernoulli random variables with parameters $\mu_i$. The alternative hypothesis is that z is drawn from the sequence of Bernoulli random variables with parameters $v_i$. One of the most efficient ways to solve it is using the log-likelihood ratio method. Let $O = \{i | z_i = 1\}$ and $Z = \{i | z_i = 0\}$. Then, log-likelihood ratio function is calculated as follows:

$$l(z) = \sum_O \log(\mu_i / v_i) + \sum_Z \log((1-\mu_i)/(1-v_i)).$$

The authentication works as follows. First, calculate the number $l(z)$. If $l(z) \geq h^*$, the authentication is granted, if $l(z) < h^*$ the authentication is denied. Here, $h_d \leq h^* \leq h_u$, where the threshold numbers $h_d$ and $h_u$ are chosen to make probabilities of type I and II errors $P_I$, $P_{II}$ fall within a given range. Type I errors occur when a legitimate individual is denied authentication. Type II errors occur when an authentication is granted to a wrong individual.

Formally, $P_I = \text{Prob}(l(z) > h_u)$, $P_{II} = \text{Prob}(l(z) < h_d)$.

Calculating Thresholds

For simplicity assume that $q_i = q$ and $p_i = p$. This implies that $\mu_i = \mu$ and $v_i = v$. Under both hypotheses the function $l(z)$ is a sum of independent identically distributed random variable (i.i.d) $\xi_i$. Each random variable is distributed according to Bernoulli but with different parameters. Under the null hypothesis:

$$\xi_i = \begin{cases} \log(\mu/v), & prob = \mu \\ \log((1-\mu)/(1-v)), & prob = 1-\mu. \end{cases}$$

The mean and variance of variance $\xi_i$ is given by:

$m_N = \mu \log(\mu/v) + (1-\mu)\log((1-\mu)/(1-v))$, $v_N = \mu \log^2(\mu/v) = (1-\mu)\log^2((1-\mu)/(1-v)) - m_N^2$.

Under the alternative hypothesis one has:

$$\xi_i = \begin{cases} \log(\mu/v), & prob = v \\ \log((1-\mu)/(1-v)), & prob = 1-v. \end{cases}$$

The mean and variance of variance $\xi_i$ is given by:

$m_A = v \log(\mu/v) + (1-v)\log((1-\mu)/(1-v))$, $v_A = v \log^2(\mu/v) + (1-v)\log^2((1-\mu)/(1-v)) - m_A^2$.

In practical applications the dimension k of vector z is significantly large (100 components or more). This corresponds to 4 measurements represented by type long numbers or by a login string of 13 characters. The distribution of a normalized sum of 100 or more Bernoulli i.i.d random variables is very well approximated by normal distribution with a mean 0, and a variance 1. Under the null hypothesis the normalized sum is given by:

$$l_N(z) = \frac{l(z) - km_N}{\sqrt{kv_N}}.$$

Let $F_{N(0,1)}(t)$ be a cumulative probability function for the normal random variable with mean 0, and variance 1. If the probability for type I error is $P_I$, choose $t_I$ in such a way that $F_{N(0,1)}(t_I = P_I)$. Then:

$h_u = t_I\sqrt{kv_N} + km_N$.

Under the alternative hypothesis the normalized sum is given by:

$$l_N(z) = \frac{l(z) - km_A}{\sqrt{kv_A}}.$$

If the probability for type II error is $P_{II}$, choose $t_{II}$ in such a way that $F_{N(0,1)}(t_{II}) = 1 - P_{II}$. Then:

$h_d = t_{II}\sqrt{kv_A} + km_A$.

Example

For the example let us set q=0.3 and p=0.9 Let probabilities of type I and II errors be equal $10^{-6}$. From the table for the cumulative density of normal distribution one finds that $t_I = -T_{II} = -4.7534$. Use the procedure outlined in the previous section to build the following table.

| k | $h_d$ | $h_u$ |
|---|-------|-------|
| 100 | 11.88 | −7.81 |
| 200 | 5.61 | −1.60 |
| 250 | 1.22 | 2.46 |

Thus one concludes that in order to achieve the required accuracy of user identification (user identity establishment) the dimension of a biometric vector is not less than 250 in the example provided.

Figure 2:
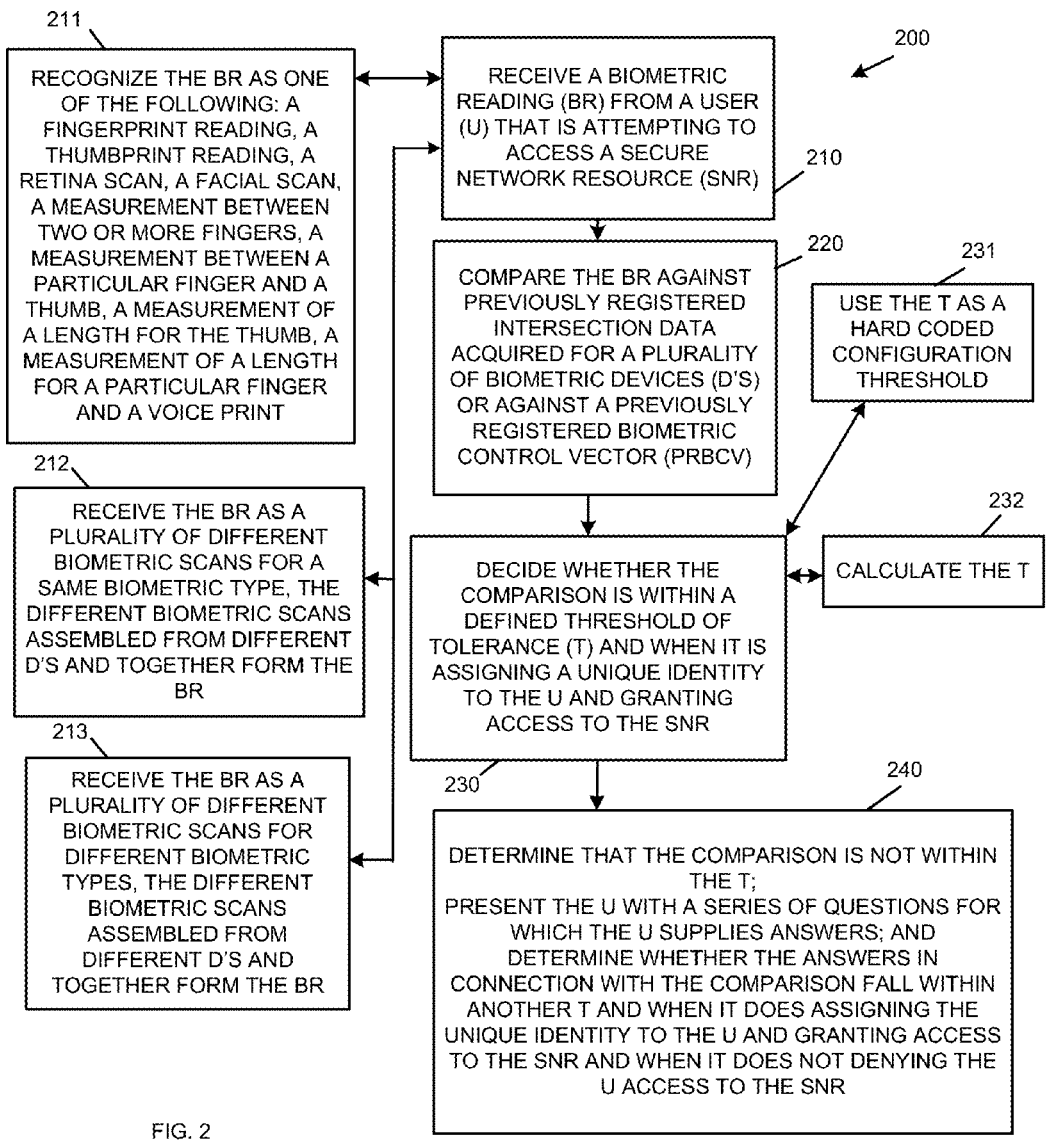
FIG. 2 is a diagram of another method for providing non-unique identity establishment that is used to authenticate a resource to a service for access in an electronic environment, according to an example embodiment.

FIG. 2 is a diagram of another method 200 for providing non-unique identity establishment that is used to authenticate a resource to a service for access in an electronic environment, according to an example embodiment. The method 200 (hereinafter "non-unique identity establishment service" is implemented in a machine-accessible and readable medium and is operational over a network. The network may be wired, wireless, or a combination of wired and wireless. In an embodiment, the non-unique identity establishment service processes to establish a unique identity for authenticating a user for access to a secure network resource and utilizes the information registered by the registration service represented by the method 100 of the FIG. 1.

Example formulae and illustrations for performing some aspects of the non-unique identity establishment service were also presented above in the sample illustration discussed at the end of the discussion of the FIG. 1.

At 210, the non-unique identity establishment service receives one or more biometric readings from user that is attempting to access a secure network resource (the resource may be an entire secure network having a plurality of resources, such as is the case with a secure Intranet that is remotely accessible over the Internet to employees of an enterprise). Again, any number of biometric terminals can be used by the user to supply the one or more biometric readings.

According to an embodiment, at 211, the non-unique identity establishment service recognizes the biometric data as one or more of the following: a fingerprint reading, a thumbprint reading, a retina scan, a facial scan, a measurement between two or more fingers, a measurement between a particular finger and a thumb, a measurement for the length of the thumb, a measurement for the length of a particular finger, a voice print, ear configuration, earlobe characteristics, blood type, a users typing cadence, etc.

Also, in an embodiment, at 212, the non-unique identity establishment service receives the biometric reading as a plurality of different biometric scans for a same biometric type. The different scans are assembled from different and separate biometric devices and together form the received biometric reading. So, the user may approach three separate fingerprint readers and take three separate scans of a finger, the combined scans form the reading received.

In an alternative embodiment, at 213, the non-unique identity establishment service receives the biometric reading as a plurality of different biometric scans for a same biometric type. The different biometric scans assembled from different biometric devices (readers, recorders, scanners, etc.) and together form the received biometric reading. So, The reading can comprise different types of biometric data, such as a voice print, facial scan, and a fingerprint scan.

At 220, the non-unique identity establishment service compares the biometric reading supplied by the user against previously registered intersection data acquired for a plurality of biometric devices. Alternatively, the non-unique identity establishment service compares the biometric reading supplied by the user against a previously registered biometric control vector. The discussion as to how to form and derive the intersection and the control vector was presented in detail above with the discussion and illustrations of the FIG. 1. Additionally, the discussion as to how to perform the comparison was also provided above in detail with the discussion and illustrations of the FIG. 1.

Accordingly, and at 230, the non-unique identity establishment service decides whether the comparison falls within a predefined threshold of tolerance. When it does fall within the predefined threshold of tolerance, the non-unique identity establishment service assigns the user a unique identity and grants access to the secure network resource. Discussions of the threshold and usage thereof were presented above with the discussion of the FIG. 1 and the sample illustrations related thereto.

In an embodiment, at 231, the non-unique identity establishment service uses the predefined threshold of tolerance as a hard coded threshold that is configured into the processing associated with the non-unique identity establishment service.

Alternatively, and in another embodiment at 232, the non-unique identity establishment service dynamically calculates and resolves the predefined threshold of tolerance. Policy may be used to dynamically drive the calculation, such that a more secure or higher priority secure network resource may necessitate a smaller degree of tolerance than a less secure network resource. This permits the non-unique identity establishment service to dynamically resolve the predefined threshold of tolerance in response to specific security policy, which itself can dynamically change. Also, the tolerance can be set based a particular set of biometric devices and their configuration or even based on a particular user. The tolerance can also be dynamically adjusted periodically to allow for changing biometric characteristics that may occur over the years for particular users or system configurations.

In an embodiment, at 240, the non-unique identity establishment service determines that based on the processing at 230 the comparison is not within the predefined threshold of tolerance. In response to this, the non-unique identity establishment service presents the user with a series of questions for which the user supplies answers in an interactive fashion. The non-unique identity establishment service then determines whether the answers fall within another different predefined threshold of tolerance. When it does, the non-unique identity establishment service assigns a unique identity to the user and grants access to the secure network resource; and when it does not, the non-unique identity establishment service denies the user access to the secure network resource. In other words, the user does not have to answer all the questions presented correctly in every case; rather, policy may permit a certain number of questions to in fact be answered incorrectly and yet the user is still properly authenticated. A user may legitimately forget answers to certain questions from time to time, such as when a user has more than one pet when the question is favorite pet name, and the like. Thus, under these circumstances, and assuming the number of correctly answered questions are within the different predefined threshold of tolerance, the user can still be authenticated for access to the secure network resource and given a unique identity for access.

Figure 3:
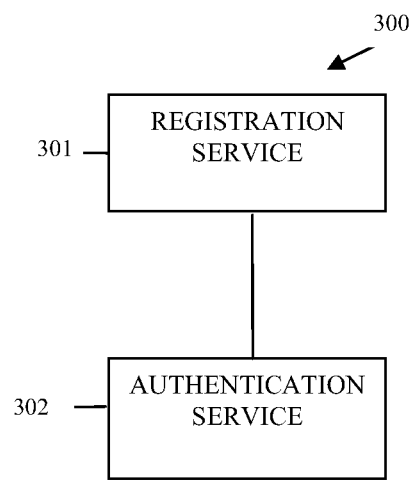
FIG. 3 is a diagram of a non-unique identity establishment system, according to an example embodiment.

FIG. 3 is a diagram of a non-unique identity establishment system 300, according to an example embodiment. The non-unique identity establishment system 300 is implemented in a machine-accessible and readable medium as instructions that process on one or more machines. Moreover, the non-unique identity establishment system 300 is operational over a network. The network may be wired, wireless, or a combination of wired and wireless. In an embodiment, the non-unique identity establishment system 300 implements, among other things, the registration service and the non-unique identity establishment service represented by the methods 100 and 200 of the FIGS. 1 and 2, respectively.

The non-unique identity establishment system 300 includes a registration service 301 and an authentication service 302. Each of these will now be discussed in turn.

The registration service 301 is implemented in a machine-accessible and computer-readable medium as instructions that execute on a machine (computer or processor-enabled device). Example processing associated with the registration service 301 was presented in detail above with reference to the method 100 of the FIG. 1.

The registration service 301 acquires a plurality of biometric data (readings, templates, normalized templates, scans, etc.) from a user during an initial registration process for purposes of unique identifying the user when that user subsequently (during a different network session) attempts to authenticate for access to a secure network resource.

In an embodiment, the registration service 301 acquires each set of biometric data from a different biometric device and then acquires the intersection for each of the sets combined. The intersection is then registered on behalf of the user by the registration service and subsequently used by the authentication service 302 (discussed below) during its compare processing when the user (during a subsequent and different network session) attempts to authenticate for access to the secure network resource.

In another case, the registration service 301 acquires each set of the biometric data from a different biometric device and creates a control vector that includes each of the sets combined. The control vector is then used by the authentication service 301 (discussed below) during its compare processing when the user (during a subsequent and different network session) attempts to authenticate for access to the secure network resource.

In some situations, the registration service 301 also acquires and registers a plurality of answers from the user to questions during the registration process. So, when the authentication service 301 (discussed below) performs compare processing for purposes of authenticating the user for subsequent access to the secure network resource, the answers are consulted against post-registration user-supplied answers and when the compare processing falls outside a predefined threshold of tolerance, the user is still permitted to authenticate even when post biometric user-supplied data standing alone fails to or is insufficient to authenticate the user. Moreover, in some cases, some of the post registration user-supplied answers can be incorrectly supplied by the user when compared with registered answers and the authentication service 302 can still successfully authenticate the user for access to the secure network resource when permitted by policy.

The authentication service 302 is implemented in a machine-accessible and computer-readable medium as instructions that execute on the same machine as the registration service 301 or an entirely different network machine. Example processing associated with the authentication service 302 was provided in detail above with reference to the method 200 of the FIG. 2 and with reference to the sample illustrations that immediately follow the discussion of the FIG. 1.

The authentication service 302 acquires subsequent or post biometric data from the user during a non-registration session of the user and compares that against the registered biometric data acquired during the registration process (registration session). The compare decides whether the user can be assigned an unique identity and granted access to the secure network resource.

In an embodiment, the authentication service 302 permits successful authentication to be resolved for the user and the identity of the user established when the compare processing falls within a predefined degree of error. An exact match is not needed; rather a fuzzy or partial match is permitted as long as it falls with an acceptable and predefined degree of error.

Figure 4:
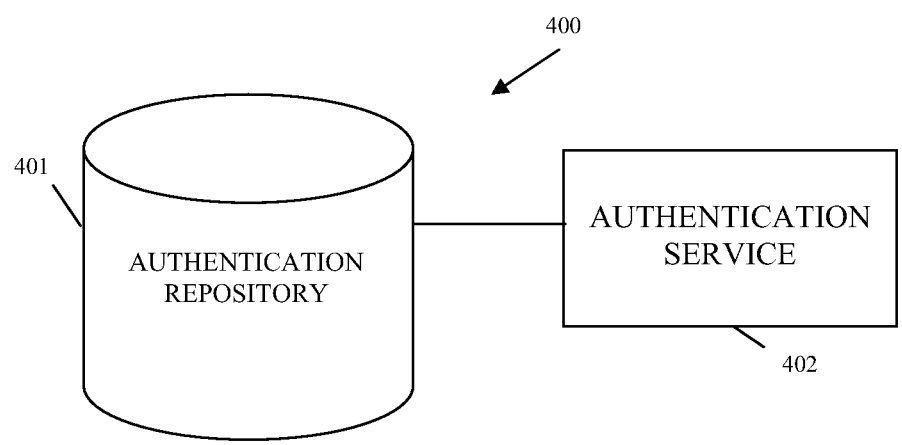
FIG. 4 is a diagram of another non-unique identity establishment system, according to an example embodiment.

FIG. 4 is a diagram of another non-unique identity establishment system 400, according to an example embodiment. The non-unique identity establishment system 400 is implemented in a machine-accessible and computer-readable medium and is processed on machines by services of a network. The network may be wired, wireless, or a combination of wired and wireless. In an embodiment, the non-unique identity establishment system 400 implements among other things the registration service and the non-unique identity establishment service represented by the methods 100 and 200 of the FIGS. 1 and 2, respectively. Also, the non-unique identity establishment system 400 presents and alternative arrangement and perspective to the non-unique identity establishment system 300 discussed above with reference to the FIG. 3.

The non-unique identity establishment system 400 includes an authentication repository 401 and an authentication service 402. Each of these and their interactions with one another will now be discussed in turn.

The authentication repository 401 is implemented in a machine-accessible and computer-readable medium and is accessible to a registration service, such as the registration service 301 of the system 300 discussed above with reference to the FIG. 3. The authentication repository 401 is also accessible to the authentication service 402.

The authentication repository 401 includes a variety of information that is updated by the registration service 301 and accessed by the authentication service 402. Some example information includes biometric intersection data, control vectors, template definitions, unique identities, mappings to unique identities, degrees of error, thresholds, answers to questions, questions, etc.

In operation, the registration service 301 interacts with a user (via multiple biometric devices and a client interface) for purposes of registering a plurality of biometric readings acquired from a plurality of biometric devices. This interaction occurs during a registration process in which the user is setting up an account for providing authentication and identity information to access a secure network resource. During the registration process, the registration service also acquires a plurality of answers to questions posed to the user during the registration process. The biometric readings and answers are then recorded by the registration service 301 in the authentication repository 401.

In an embodiment, the registration service 301 retains or transforms the biometric readings as an intersection for each or all of the readings acquired during the registration process. The intersection is then recorded in the authentication repository 401.

In another embodiment, the registration service 301 retains or creates a control vector from the biometric readings acquired from the user during the registration process. The control vector includes each of the separate biometric readings and a test set of readings. The control vector is then recorded by the registration service 301 in the authentication repository 401.

The authentication service 402 is implemented in a machine-accessible and computer-readable medium as instructions that execute on one or more of the network machines. Example processing associated with the authentication service was provided in detail above with reference to the FIGS. 1-3.

The authentication service 402 acquires post registration biometric readings from the user when the user attempts to subsequently (post registration and separate network session) access the secure network resource. The authentication service 402 can also, if necessary (in other words the post registration biometric readings were insufficient to establish a unique identity for the requesting user), post registration answers to the questions from the user.

Next, the authentication service 402 compares the post registration biometric readings against the registered biometric readings housed and acquired from the authentication repository 401 and if this is sufficient then establishes a unique identity for the user and grants access to the secure network resource. However, if the comparison is insufficient to establish a unique identity, the authentication service further compares interactively acquired post registration answers to the questions against the previously registered answers to those questions (acquired from the authentication repository 401). If this is sufficient (not that every answer does not have to always be correct), the authentication service 402 establishes the unique identity for the user and grants access to the secure network resource.

So, during the compare processing performed by the authentication service 402 exact matches to the registered biometric readings and the registered answers do not have to occur and are not needed to successfully authenticate the user for access to the secure network resource. Rather, a predefined degree of error is permitted to be present during the compare processing and if the compare processing falls within the degree of error, the authentication service 402 is able to successfully authenticate the user and establish a unique identity for the user to use when accessing the secure network resource.

In an embodiment, the predefined degree of error is dynamically statistically calculated, such as in the manner presented in detail above with the sample illustrations that immediately followed the discussion of the FIG. 1.

In still another case, the predefined degree of error is preconfigured as a processing parameter to the authentication service 402 and can be varied according to a security level associated with the secure network resource that the user is attempting to access. The processing parameter may even be a profile or metadata, such as a policy, which is dynamically acquired and evaluated by the authentication service 402 when the user attempts to connect with the secure network resource.

In an embodiment, the user does not ever supply any user identifier to the registration service or subsequently to the authentication service 402. So, the user is dynamically discovered based on the biometric readings and answers to the questions. The system 400 may not even possess the means for identifying a particular user beyond the biometric readings and answers to questions. In other words, the authentication service 402 can not map the user to a specific name, address, etc. All the system 400 knows about the user is the biometric readings and answers to the questions, the exact name or user identifier is not relevant.

In still another embodiment, the registration service may also record something that the user possesses during the registration process. For example, the user may possess an electronic badge, a physical key, a card with magnetic information, a randomly generated number that a device that the user possesses changes based on a present time (so the user uses the device to get the number as of the time of registration and then subsequently at a different time when authenticating (the authentication service is synchronized to generate the same random number as the user's device—note in this situation the user may not even have to supply a registration random number rather just a device identifier for the device that the user uses to produce the random number)), a digital key, or even a number/identifier embedded in a capsule that is implanted somewhere on the user. The authentication service 402 then uses the biometric readings, the answers to the questions, and verifies the thing the user needs to possess when authentication the user for access to the secure network resource. So, a tripartite authentication process can be used as well to further enhance security.

It is also noted that a single one of the biometric devices, with some embodiments, supplies multiple different biometric readings. So, each biometric device can supply multiple scans or readings during the registration process and during a subsequent access attempt made by a user to access the secure network resource.

One now fully appreciates how non-unique identity information acquired from a user can be collected and evaluated in novel manners to establish a unique identity for a user. With this approach no password or critical secret about the user is ever stored or retained, such that it cannot be compromised. This increases security and alleviates users of remembering, changing, and managing, passwords. Administrators are also relieved of maintenance burden associated with password administration and support.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A machine-implemented method, comprising:
    receiving multiple sets of biometric data, each set of biometric data received from one of multiple different biometric devices associated with a user, each set of biometric data represented as a separate template of a plurality of templates, wherein each template comprises a plurality of metrics, the metrics concerning physical characteristics represented by a received set of biometric data of a represented scan from a particular one of the multiple different biometric devices and wherein the plurality of metrics of each template standing alone is considered to be non-unique for establishing an electronic identity for the user;
    normalizing each template, wherein normalizing each template comprises normalizing one or more of the plurality of metrics in the template making the set of biometric data of the represented scan of the template invariant across each of the multiple biometric devices;
    calculating an intersection of the multiple biometric data based on the normalized plurality of templates, wherein the intersection of the multiple biometric data is considered to be a unique factor in establishing the identity for the user;
    acquiring a plurality of answers to a plurality of questions from the user, some of the answers to some of the questions supplied by the user and others of the questions and the answers supplied by an administrator; and
    registering the intersection of the multiple biometric data and the answers to the questions as a mechanism to subsequently authenticate the user and establish the identity for the user for access to a secure resource over a network.

2. The method of claim 1, wherein receiving further includes receiving three sets of biometric data, each set of biometric data associated with one of three biometric devices and each biometric device used for acquiring a same type of biometric data.

3. The method of claim 2, wherein receiving further includes identifying each of the three biometric devices as a finger print or thumb print reader.

4. The method of claim 1 further comprising:
    replacing the intersection of the biometric data with an initially recoded vector that includes each set of biometric data from the multiple biometric data;
    recoding one or more tests with the user to recreate the multiple biometric data a second time and recording the test as one or more test vectors;
    creating a control vector that includes the initial recorded vector and the one or more test vectors; and
    registering the control vector with the answers as the mechanism in place of the intersection of the biometric data to subsequently authenticate the user and establish the identity for the user for access to the secure resource over the network.

5. The method of claim 4 further comprising, defining a threshold of permissible error for matching the control vector against subsequently entered biometric data received from the user and registering the threshold with the control vector and the answers as the mechanism.

6. The method of claim 1, further comprising:
    receiving a biometric reading from a user that is attempting to access a secure network resource;
    comparing the reading against the registered intersection of the multiple biometric data; and
    deciding whether the comparison is within a threshold of tolerance and when it is assigning a unique identity to the user and granting access to the secure network resource, the threshold of tolerance is calculated for the comparison based on a predefined level of accuracy for identifying the user.

7. The method of claim 6 further comprising:
    determining that the comparison is not within the threshold of tolerance;
    presenting the user with a series of from the plurality of questions;

receiving answers to the presented questions from the user; and determining whether the received answers in connection with the comparison fall within another threshold of tolerance and when it does assigning the unique identity to the user and granting access to the secure network resource and when it does not denying the user access to the secure network resource.

8. The method of claim 6, wherein receiving further includes recognizing the biometric reading as one of the following: a fingerprint reading, a thumbprint reading, a retina scan, a facial scan, a measurement between two or more fingers, a measurement between a particular finger and a thumb, a measurement of a length for the thumb, a measurement of a length for a particular finger, ear configuration, earlobe characteristics, blood type, typing cadence, and a voice print.

9. The method of claim 6, wherein receiving further includes receiving the biometric reading as a plurality of different biometric scans for a same biometric type, the different biometric scans assembled from different biometric devices and together form the biometric reading.

10. The method of claim 6, wherein receiving further includes receiving the biometric reading as a plurality of different biometric scans for different biometric types, the different biometric scans assembled from different biometric devices and together form the biometric reading.

11. A system comprising:
a processor; and
a memory coupled with and readable by the processor and having stored therein instruction which, when executed by the processor, cause the processor to provide a registration service by:
receiving multiple sets of biometric data, each set of biometric data received from one of multiple different biometric devices associated with a user, each set of biometric data represented as a separate template of a plurality of templates, wherein each template comprises a plurality of metrics, the metrics concerning physical characteristics represented by a received set of biometric data of a represented scan from a particular one of the multiple different biometric devices and wherein the plurality of metrics of each template standing alone is considered to be non-unique for establishing an electronic identity for the user;
normalizing each template, wherein normalizing each template comprises normalizing one or more of the plurality of metrics in the template making the set of biometric data of the represented scan of the template invariant across each of the multiple biometric devices;
calculating an intersection of the multiple biometric data based on the normalized plurality of templates, wherein the intersection of the multiple biometric data is considered to be a unique factor in establishing the identity for the user;
acquiring a plurality of answers to a plurality of questions from the user, some of the answers to some of the questions supplied by the user and others of the questions and the answers supplied by an administrator; and
registering the intersection of the multiple biometric data and the answers to the questions as a mechanism to subsequently authenticate the user and establish the identity for the user for access to a secure resource over a network.

12. The system of claim 11, wherein receiving further includes receiving three sets of biometric data, each set of biometric data associated with one of three biometric devices and each biometric device used for acquiring a same type of biometric data.

13. The system of claim 12, wherein receiving further includes identifying each of the three biometric devices as a finger print or thumb print reader.

14. The system of claim 11, wherein providing the registration service further comprises:
replacing the intersection of the biometric data with an initially recoded vector that includes each set of biometric data from the multiple biometric data;
recoding one or more tests with the user to recreate the multiple biometric data a second time and recording the test as one or more test vectors;
creating a control vector that includes the initial recorded vector and the one or more test vectors; and
registering the control vector with the answers as the mechanism in place of the intersection of the biometric data to subsequently authenticate the user and establish the identity for the user for access to the secure resource over the network.

15. The system of claim 14, wherein providing the registration service further comprises defining a threshold of permissible error for matching the control vector against subsequently entered biometric data received from the user and registering the threshold with the control vector and the answers as the mechanism.

16. The system of claim 11, wherein the instructions further cause the processor to provide an authentication service by:
receiving a biometric reading from a user that is attempting to access a secure network resource;
comparing the reading against the registered intersection of the multiple biometric data; and
deciding whether the comparison is within a threshold of tolerance and when it is assigning a unique identity to the user and granting access to the secure network resource, the threshold of tolerance is calculated for the comparison based on a predefined level of accuracy for identifying the user.

17. The system of claim 16, wherein providing the authentication service further comprises:
determining that the comparison is not within the threshold of tolerance;
presenting the user with a series of questions from the plurality of questions;
receiving answers to the presented questions from the user; and
determining whether the received answers in connection with the comparison fall within another threshold of tolerance and when it does assigning the unique identity to the user and granting access to the secure network resource and when it does not denying the user access to the secure network resource.

* * * * *

UNITED STATES PATENT AND TRADEMARK OFFICE
CERTIFICATE OF CORRECTION

PATENT NO.        : 8,776,198 B2
APPLICATION NO.   : 12/024640
DATED             : July 8, 2014
INVENTOR(S)       : Tsitkova et al.

It is certified that error appears in the above-identified patent and that said Letters Patent is hereby corrected as shown below:

In the Specification

Column 3, line 10, delete "stand alone" and insert -- standalone --, therefor.

Signed and Sealed this
Twenty-fourth Day of February, 2015

Michelle K. Lee
*Deputy Director of the United States Patent and Trademark Office*